United States Patent [19]
Sibigtroth

[11] Patent Number: 5,432,950
[45] Date of Patent: Jul. 11, 1995

[54] SYSTEM FOR SECURING A DATA PROCESSING SYSTEM AND METHOD OF OPERATION

[75] Inventor: James M. Sibigtroth, Round Rock, Tex.

[73] Assignee: Motorola Inc., Schaumburg, Ill.

[21] Appl. No.: 69,326

[22] Filed: Jun. 1, 1993

Related U.S. Application Data

[63] Continuation-in-part of Ser. No. 589,246, Sep. 28, 1990, Pat. No. 5,251,304.

[51] Int. Cl.⁶ .................... G06F 12/00; G06F 12/14
[52] U.S. Cl. ........................ 395/425; 380/3; 364/232.8; 364/286.5; 364/DIG. 1
[58] Field of Search ............... 395/800, 575, 425, 400; 380/3, 4

[56] References Cited

U.S. PATENT DOCUMENTS

| | | | |
|---|---|---|---|
| 4,590,552 | 5/1986 | Guttag et al. | 395/425 |
| 5,014,191 | 5/1991 | Padgaonkar et al. | 395/425 |
| 5,057,999 | 10/1991 | Kose et al. | 395/425 |
| 5,067,077 | 11/1991 | Wakimoto et al. | 395/400 |
| 5,134,700 | 7/1992 | Eyer et al. | 395/425 |
| 5,293,610 | 3/1994 | Schwarz | 395/425 |

Primary Examiner—Alyssa H. Bowler
Assistant Examiner—Alpesh M. Shah
Attorney, Agent, or Firm—Keith E. Witek

[57] ABSTRACT

A system (10) and a method for securing an integrated circuit each have at least three modes of security. A first mode of security is a normal mode of operation wherein access to data which is internal to the integrated circuit is not limited. The normal mode of security may be readily changed to a revocable security mode or an irrevocable security mode. In the revocable security mode, the data stored internal to the integrated circuit package portion (11) is not accessible from external to the integrated circuit. The revocable mode may be changed to either the normal mode of operation or the irrevocable mode of operation by a user-defined key. The irrevocable security mode offers security similar to the revocable security mode. The difference is that the irrevocable security mode cannot be exited once entered. Only destructive techniques, such as depotting, have a possibility of changing the irrevocable security mode.

19 Claims, 4 Drawing Sheets

SYSTEM FOR SECURING A DATA PROCESSING SYSTEM AND METHOD OF OPERATION

This is a continuation-in-part of Ser. No. 07/589,246, filed Sep. 28, 1990, now U.S. Pat. No. 5,251,304.

FIELD OF THE INVENTION

The present invention relates generally to integrated circuits, and more particularly, to improving security for a data processor having on-chip memory devices.

BACKGROUND OF THE INVENTION

Memory elements contained within an integrated circuit package having a data processor, such as a microcontroller unit (MCU), are typically used to store control programs, data, and other information. Such memory elements include but are not limited to ROM, RAM, EPROM, EAPROM, or EEPROM. There is often a need to prevent read or write accesses to these memory elements for various security reasons. A known security method for protecting unauthorized reading of the contents of memory elements used within a data processor is accomplished with the use of a software programmable bit in a memory configuration register. When the programmable bit is placed in an active state, the bit causes the data processor to operate in one of several possible single-chip modes. In these modes, the data processor is limited by only being able to address on-chip memory for instructions and data, as opposed to addressing memory external to the chip. However, because chip memory space within the chip is typically limited, the instructions and data contained within the chip are also limited in size. If the controller programs or data increase in size within the chip, larger on-chip memory is required to maintain security of the memory elements when operating in a single-chip mode. Another disadvantage with a security feature requiring a single-chip mode of operation is the inability to communicate with any peripheral devices external to the chip. Accordingly, a more general purpose, flexible and inexpensive solution is required for maintaining security of internal memory elements while expanding the microcontroller system.

SUMMARY OF THE INVENTION

The previously mentioned disadvantages are overcome and other advantages achieved with the present invention. In one form, the present invention comprises a data processing system having an integrated circuit with a security system. The integrated circuit has circuitry for manipulating integrated circuit data. Circuitry within said integrated circuit for storing integrated circuit data is coupled to the circuitry for manipulating integrated circuit data. Circuitry for providing integrated circuit data external to the integrated circuit is coupled to the circuitry for manipulating integrated circuit data. The security system is coupled to the means for providing integrated circuit data. The security system provides one of three security levels to the means for providing integrated circuit data. A first security level indicates a normal operation mode wherein integrated circuit data may be accessed from external to the integrated circuit through the means for providing integrated circuit data without security restrictions. A second security level indicates a revocable security mode wherein access to integrated circuit data from external to the integrated circuit is limited. The revocable security mode being capable of being changed to another security level. A third security level indicates an irrevocable security mode wherein access to integrated circuit data from external to the integrated circuit is limited. The irrevocable security mode cannot be nondestuctively changed to another security level.

In another form, the invention comprises a method of providing a security feature in a data processor integrated circuit. The security feature is used in a data processing system having at least one peripheral device coupled to the data processor integrated circuit. The integrated circuit has a processing unit and a memory with programmable security from unauthorized observation of internal processing operations in response to receipt of externally provided signals. The method comprises receiving data and instructions from the at least one peripheral device and processing the received data and instructions with the processing unit. The processing unit decodes the received instructions and provides a first control signal indicating when the processing unit will receive an instruction. Data or instructions from the memory are provided to the processing unit in response to receiving addresses from the processing unit. A second control signal is received from a user of the data processing system and enables the programmable security by providing a third control signal which is provided having one of at least three logical states. Each of the at least three logical states is not affected by an absence of power or presence of a reset, and each of the at least three logic states represents a different mode of security. Processing of externally provided instructions is selectively inhibited when the first control signal is asserted and in response to the third control signal.

The present invention will be more clearly understood from the detailed description below in conjunction with the accompanying drawings.

DESCRIPTION OF A PREFERRED EMBODIMENT

Figure 1:
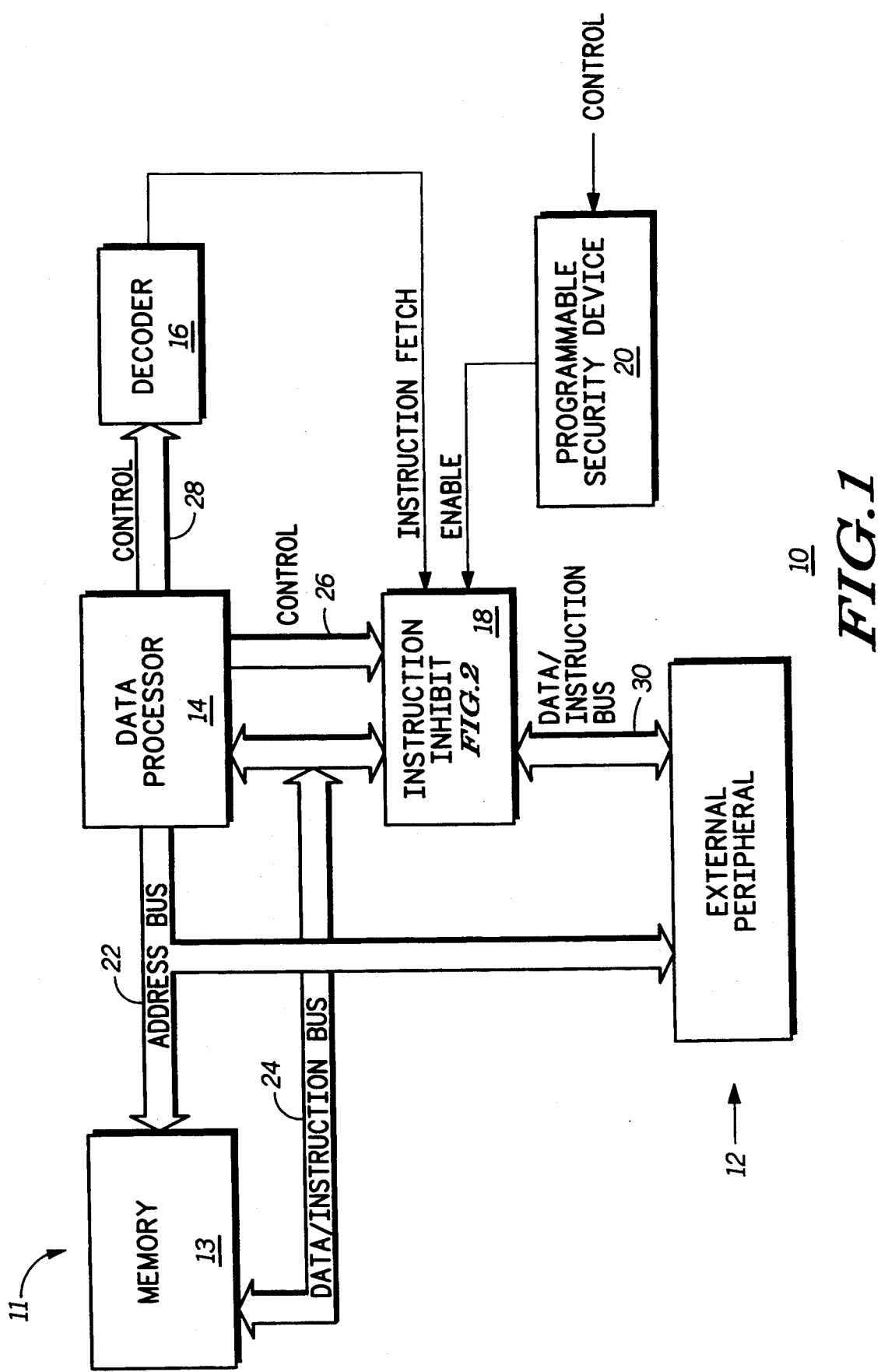
FIG. 1 illustrates in block diagram form a data processing system in accordance with the present invention.

Illustrated in FIG. 1 is a block diagram of a data processing system 10, comprised generally of a single integrated circuit package portion 11 and a peripheral portion 12 having an external peripheral device. It should be apparent that some peripheral devices may be located within the integrated circuit package portion 11. The integrated circuit package portion 11 has a memory 13, a data processor 14, a decoder 16, an instruction inhibit circuit 18, and a programmable security device 20. The data processor may be a microcontroller unit (MCU), a digital signal processor (DSP), a gate array, a programmable logic array, a microcomputer, hardwired logic, or any like software execution device or data manipulation/calculation device. The instruction inhibit circuit 18 can read data from and write data to the external peripheral portion 12. The instruction inhibit circuit 18 also contains logic to limit the access granted to and/or from the external peripheral portion 12 based upon one or more security modes.

Memory 13 consists of one or more of a random access memory (RAM) cell, a read only memory (ROM) cell, an electrically erasable programmable read only memory (EEPROM), an erasable programmable read only memory (EPROM), a flash memory cell, a dynamic random access memory (DRAM) cell, a static random access memory (SRAM) cell, a fast static random access memory (FSRAM) cell, a content addressable memory (CAM) cell, a ferroelectric memory cell, and/or a ferromagnetic memory cell. Other memory devices exist in the art and may be used within memory 13.

In the integrated circuit package portion 11, memory 13 is connected to the data processor 14 with an address bus 22 and a data/instruction bus 24. Typically, an address bus and/or a data bus contain one or more bits (e.g. a one bit machine, an eight bit machine, a sixteen bit machine, a thirty-two bit machine, and the like). The data processor 14 is connected to the instruction inhibit circuit 18 by the data/instruction bus 24 and a control bus 26. Control bus 26 is connected from a first control output of the data processor 14 to a first control input of the instruction inhibit circuit 18 and contains at least one control signal, a "Data Read" signal and a "Data Write" signal are typical control signals used in FIG. 1. A second control output bus 28 is connected from a second control output of data processor 14 to a control input of decoder 16. An output of decoder 16 is a signal labeled "Instruction Fetch" and is connected to a second control input of the instruction inhibit circuit 18. The programmable security device 20 has an output for providing a signal labeled "Enable" that is connected to a third control input of the instruction inhibit circuit 18 and is activated in response to an input "Control" signal. The Control signal may be internally generated by the integrated circuit or input/processed from external to the integrated circuit. The peripheral portion 12 is connected to memory 13 and data processor 14 by address bus 22. Peripheral portion 12 is connected to the instruction inhibit circuit 18 by a data/instruction bus 30.

There are a variety of applications for a data processor system such as data processing system 10 of FIG. 1. One application is in the area of control applications such as pay-for-view TV control. When data processor 14 is released from a reset condition, it first addresses memory locations either contained within the integrated circuit portion 11 or within an external memory of peripheral portion 12 if unsecured, depending on how the system is configured. Data processor 14 receives instructions and data for initializing registers (not illustrated) internal to data processor 14. Once the initialization process is complete, data processor 14 executes instructions by addressing memory external and/or internal to the integrated circuit portion 11 of system 10, for the purpose of controlling peripherals, either internal or external to the integrated circuit portion of data processing system 10, that enables viewing of TV programs in accordance with predetermined guidelines or permissions.

In operation, system 10 of FIG. 1 is generally operating in one of three modes. The first of the three operational modes is a "single chip mode". The single chip mode of operation requires data processor 14 to address predetermined memory locations of memory 13 via address bus 22 for the purpose of either reading instructions and data from memory 13 or writing data to memory 13. Predetermined addresses are provided at an address output of data processor 14, while data and instructions are coupled to each of memory 13 and data processor 14 by data/instruction bus 24. The single chip mode is characterized by the fact that only memory 13 and data processor 14, along with address bus 22 and data/instruction bus 24 are utilized.

A second mode of operation of system 10 is an "expanded mode". In the expanded mode of operation, data/instruction bus 30 is coupled to data/instruction bus 24 by the instruction inhibit circuit 18, which is effectively transparent in expanded mode operation. In the expanded mode of operation, data processor 14 can access either memory 13 or peripheral portion 12 for both instructions and data. Expanded mode operation utilizes memory 13, data processor 14, address bus 22, data/instruction bus 24, data/instruction bus 30 and instruction inhibit circuit 18. Since expanded mode operation allows data processor 14 to read instructions from peripheral portion 12, the instructions presented to data processor 14 via data/instruction buses 24 or 30, may be readily observed or interrupted for the purpose of reading or modifying the contents of memory 13; therefore the expanded mode of operation is not secure.

A third mode of operation of system 10 is a "secure mode". The secure mode of operation affects the interaction of memory 13, data processor 14, decoder 16, programmable security device 20, address bus 22, data/instruction buses 24 and 30, and control buses 26 and 28 which are contained within integrated circuit package portion 11 and peripheral portion 12 contained within data processing system 10.

Figure 2:
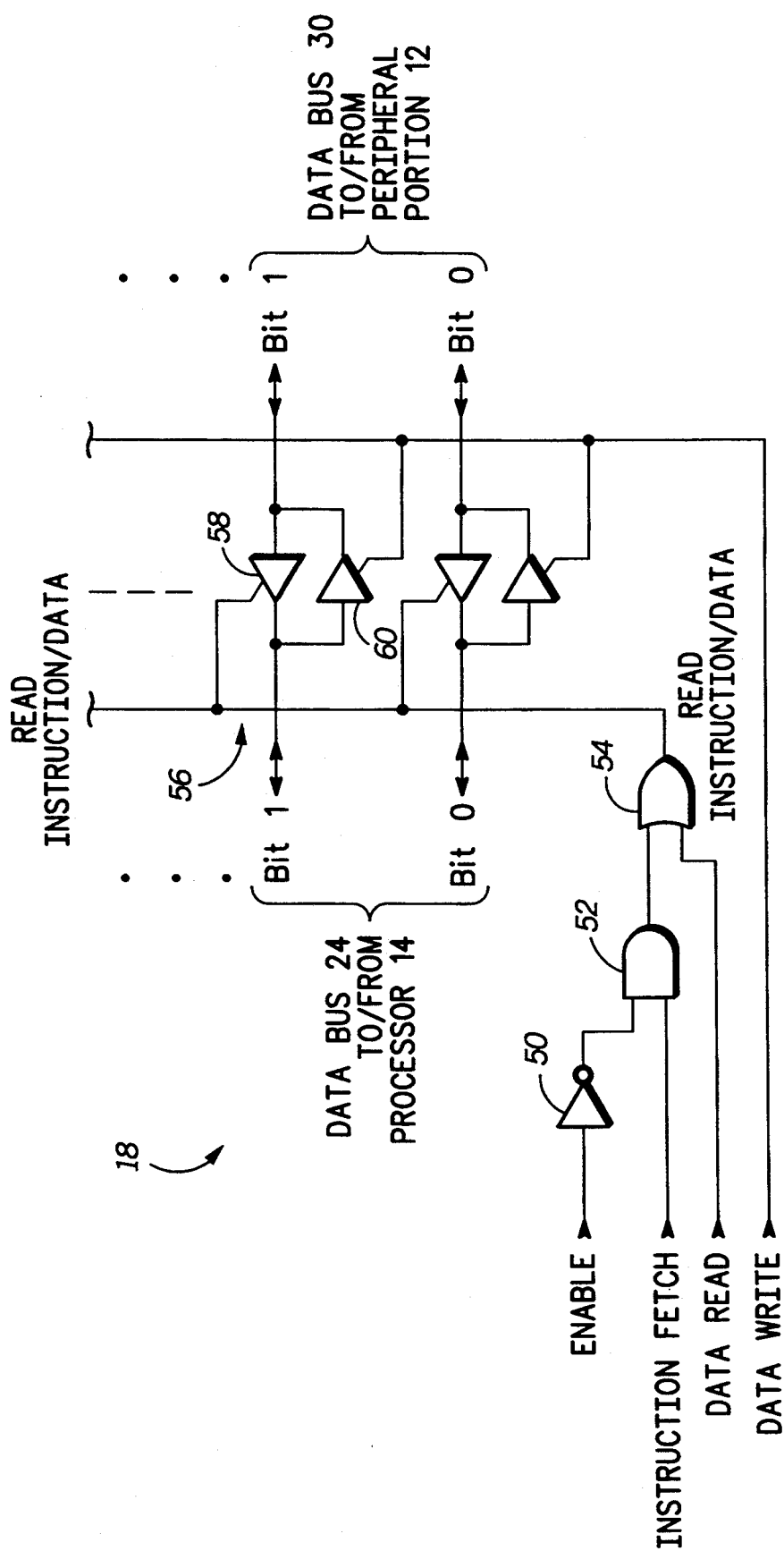
FIG. 2 illustrates in logic diagram form the instruction inhibit circuitry of the data processing system of FIG. 1.

Illustrated in FIG. 2 is a logic diagram of the instruction inhibit circuit 18 of FIG. 1 and generally comprising an inverter 50, an AND gate 52, an OR gate 54 and one or more pair of isolation buffers such as an isolation buffer pair 56 comprising buffers 58 and 60. An input of inverter 50 receives the Enable signal from programmable security device 20 of FIG. 1. A first input of AND gate 52 is connected to an output of inverter 50, and a second input of AND gate 52 is connected to the Instruction Fetch signal of decoder 16 of FIG. 1. A first input of OR gate 54 is connected to an output of AND gate 52, and a second input of OR gate 54 is connected to the Data Read signal contained within control bus 26 of FIG. 1. An output of OR gate 54 provides an output signal labeled "Read Instruction/Data". Each isolation buffer pair, such as buffers 58 and 60, has a first control input for receiving the Read Instruction/Data signal and a second control input for receiving the Data Write signal. Each isolation buffer pair is connected to data/instruction bus 30 and data/instruction bus 24 of FIG. 1.

In operation, decoder 16 of FIG. 1 decodes control information from data processor 14 and provides an active high Instruction Fetch signal if data processor 14 is fetching an instruction. In the illustrated form, an active signal is a logic high signal. The Enable signal provided by programmable security device 20 is activated when the data processing system 10 of FIG. 1 is to operate in the secure mode in response to the Control signal. Programmable security device 20 may be implemented as any type of nonvolatile storage device meaning that the state of the Enable signal remains valid even if power is removed from data processing system 10. Therefore, in one form, programmable security device 20 may be implemented with a nonvolatile memory. The isolation buffers of FIG. 2 are controlled by the combinational logic of inverter 50, AND gate 52, OR gate 54, by the Data Read and Data Write control signals provided by control bus 26, and by the Enable and Instruction Fetch control signals. The illustrated logic gates of FIG. 2 function to decode the received control signals. When the Data Write signal of FIG. 2 is active, each of the isolation buffer pairs of FIG. 2 connects a predetermined data bit from data/instruction bus 24 to data/instruction bus 30. When the Data Read signal is active, data from data/instruction bus 30 is connected to data/instruction bus 24. When the Instruction Fetch signal of FIG. 2 is active and the Enable signal is inactive, instructions from data/instruction bus 30 are connected to data/instruction bus 24. When the Enable signal is active, instructions are read only from memory 13 and the isolation buffers of FIG. 2 are switched off to provide isolation between data/instruction buses 24 and 30. Furthermore, when the Enable signal is active, other logic ensures that instructions present on data/instruction bus 24 are non-interruptible and non-visible from outside the single integrated circuit package portion 11 of FIG. 1. Since the instructions present on data/instruction bus 24 are isolated from data/instruction bus 30, the single integrated circuit package portion 11 of FIG. 1 is operating in a secure mode.

It should be well understood that information residing in the memory of microcontrollers can be of a proprietary nature. The need to prevent access to this information is a major concern in many system designs. The secure mode of operation is a usually mix between the single chip and the expanded modes of operation. In the secure mode of operation, instruction read cycles performed by the data processor are confined to the data processor as in the single chip mode, whereas data reads and writes initiated by the data processor can be made either internal or external to the data processor in an expanded mode of operation. The secure mode of operation provided herein is an effective and economical solution to isolate instruction information of a data processor while allowing the data processor to read or write non-proprietary data external to the data processor. It should also be apparent that other operations than the operations detailed herein may be performed within system 10 during each of the single chip and expanded modes of operations. Therefore, the present invention may be considered as having a plurality of single chip modes and expanded modes of operation. However, regardless of the variety of operations considered permissible within a single chip or expanded mode of operation, the functionality of the secure mode insures that memory 13 may not be read or modified by unauthorized sources external to the single integrated circuit package.

By now it should be apparent that there has been provided a data processor with memory having a programmable controlled security feature. There are many additional configurations for implementing the invention described above. For example, the memory device in FIG. 1 could include volatile as well as nonvolatile memory or combinations thereof. Multiple memory devices may be used. Memory management circuits may be included within the microcontroller. System 10 may be implemented with separate data and instruction buses. Multiple internal and external peripheral devices may be added and a variety of peripheral devices may be utilized. Inhibit circuit 18 or decoder 16 may be integrated within data processor 14, and any memory device may be used for programmable security device 20 including fusible links. The logic gates and isolation buffers of FIG. 2 could include further decoding to define a limited address range of data accesses. The isolation buffers may be implemented using MOS, bipolar, or any other types of transistors.

Although FIGS. 1-2 illustrate that a data processor may be made to be secure, a more sophisticated security system is required in some cases. For example, if one bit is used as a security bit in an integrated circuit, the integrated circuit may be depotted and easily changed from a secure state to an insecure state. For example, assume that a logic one stored in a non-volatile cell signifies that the integrated circuit is in a secure mode. Depotting an integrated circuit means that the integrated circuit located within the integrated circuit package is exposed to the atmosphere. Usually the process of exposing the integrated circuit die to the atmosphere requires a destructive process which damages/etches either the package and/or the integrated circuit. The exposed integrated circuit is then exposed to an energy source such as ultra violet (UV) light. The UV light alters the contents of the one bit of security thereby placing the integrated circuit in an unsecured mode. In the unsecured mode, a human user has access to the integrated circuit memory and on-chip data and can illegally pirate or illegally alter the contents of the integrated circuit.

Furthermore, several secure devices have one secure mode which cannot be returned to an unsecured mode without using destructive methods. Therefore, the security feature is usually not testable (i.e. if the secure mode is tested by the manufacturer by placing the part in the secure mode, the manufacturer cannot nondestructively unsecure the part for use by a customer). In addition, the parts must be shipped to customers in an unsecured mode. Therefore, during shipping and handling, any proprietary information stored in the circuit is compromised. If the parts are lost, stolen, etc., during shipping/handling/storage then the proprietary data on the integrated circuit may be pirated with little difficulty. For the above reasons, additional security for the system of FIG. 1 may be required in some embodiments. The additional security must allow for improved internal data protection, greater protection from depotting techniques, and an improved secure shipping/handling mode.

In order to achieve the above stated objectives, a security system having at least three levels of operation or three levels of security is used. One security mode or security level is referred to as a normal mode of operation. The normal mode of operation includes one of two modes of operation referred to above as an expanded mode and a single chip mode. A second security mode is referred to as an revocable security mode, and a third security mode is referred to as a irrevocable security mode. The revocable security mode may be changed to a normal mode of operation or to an irrevocable security mode in a non-destructive manner.

In order to change the security mode from the revocable security mode, the entrance of a key is required. The key may be any special procedure known only to the customer and the manufacturer. The key may be fixed in hardware or may be provided via a software program stored on-chip or in an external secure device. For example, if an integrated circuit is in a revocable secure mode and the user wants to get to a normal unsecured mode, the user may be required to write a predetermined value to a predetermined address. For example, the user may have to write a value of 17FA in hexadecimal to an address location 889D in hexadecimal. Once this write operation is performed, the revocable security mode may exited and the normal mode of operation entered by erasing and re-programming internal security bits. In other words, entrance of the key allows erase and program access to internal security bits. In another form, the user may be required to read a value from a location or write a predetermined value or write to a predetermined address within a predetermined number of clock cycles (i.e. 300 clock cycles after reset, and the like). Multiple sequenced values may be required as input in order to achieve the proper key sequence. Pins on the integrated circuit package may need to be placed at a predetermined voltage level to exit the revocable security mode. In general, the key is similar to the combination of a lock. Those who know the combination can change the security, those that do not know the combination will not be able to change the security or at the very least will be extremely inconvenienced by the security key mechanism. It should be apparent that the criterion for keys and types of keys which may be used herein are abundant.

The irrevocable security mode can only be altered by destructive methods (i.e. depotting). In many cases the depotting process will destroy the integrated circuit and absolutely no information will be gained by a pirate. Furthermore, if the depotting process works, any alteration of the irrevocable security mode places the integrated circuit into the revocable security mode. Therefore, after depotting, the user must discover/use the key in order to enter the normal mode of operation. In many cases, the depotting process will destroy enough of the depotted part to drastically impair the parts ability to properly execute the key process. In general the two-tier revocable/irrevocable security mode is more difficult to pirate than other integrated circuit security measures.

Figure 3:
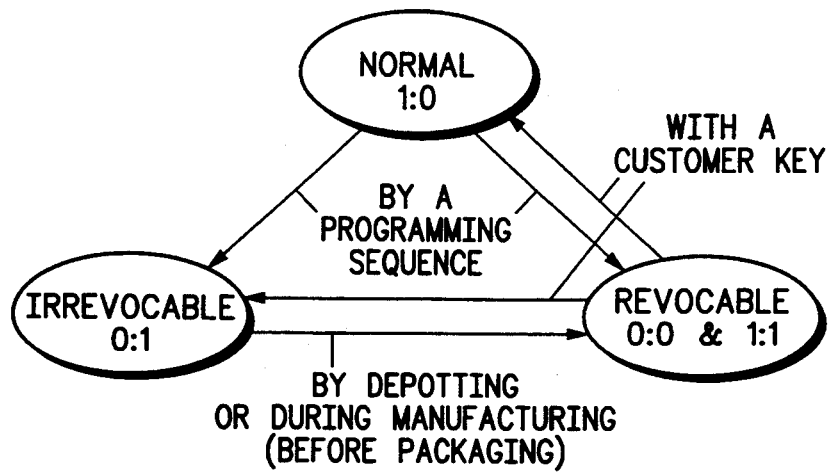
FIG. 3 illustrates, in a state diagram, three security modes for the system of FIG. 1.

FIG. 3 illustrates a state diagram which illustrates the normal mode of operation, the irrevocable security mode, the revocable security mode, and how the modes of security interrelate. The security mode is indicated by a binary value having at least two bits. Exactly two bits are used in FIG. 3 to represent the security mode. FIG. 3 illustrates that the normal mode of operation is indicated by a 10 binary value, and the irrevocable mode is represented as a 01 binary value. In another form, a 01 binary value may represent the normal mode of operation and a 10 binary value may represent the irrevocable security mode. The irrevocable security mode is represented by a 00 binary value and/or a 11 binary value.

Non-volatile bits or non-volatile memory cells such as a read only memory (ROM) cell, an electrically erasable programmable read only memory (EEPROM), an erasable programmable read only memory (EPROM), a flash memory cell to store the third control signal, a ferroelectric memory cell, and/or a ferromagnetic memory cell are used to store the at least two binary security bits. Therefore, a loss of power, a reset, and the like will not alter the security mode.

When an integrated circuit wafer is manufactured, all nonvolatile memory cells that are in close proximity tend to be formed having the same logic state (i.e. a logic zero or a logic one). It is most likely therefore that the integrated circuit will be formed having non-volatile security memory bits with either a 11 binary value or a 00 binary value. The integrated circuits will then be exposed to UV light to ensure that no 01 binary values or 10 binary values are stored as security values (an integrated circuit packaged in the irrevocable security mode is useless because destructive methods must subsequently be used to change the security mode for customer use). Therefore, all the integrated circuits will be in the revocable security mode when packaged and first tested. The key will be used by the manufacturer to exit the revocable security mode and enter the normal mode of operation. The irrevocable security mode may be tested at wafer probe or just before assembly wherein no destructive methods are needed due to the fact that the wafer and integrated circuit dies are already exposed to the atmosphere (i.e. not yet packaged).

In FIG. 3, assume that the integrated circuit is initially in the normal mode of operation. The security bits may be altered from the normal mode of operation state by a predetermined programming sequence to place the integrated circuit in one of either the irrevocable security mode or the revocable security mode. Any user, in normal mode of operation, may place the integrated circuit in either the irrevocable security mode or the revocable security mode with little difficulty.

Once in the revocable security mode, the irrevocable security mode may be invoked by entering a predetermined first user key as illustrated in FIG. 3. Also, the normal mode of operation may be returned to via a predetermined second user key. In general, the revocable security mode provides security to both the integrated circuit (IC) part and internal IC data in a manner similar to that discussed above for FIGS. 1-2. The difference is that the security mode may be changed via a key to another security mode. Therefore, the integrated circuit offers maximum protection from pirating when being transported, shipped, etc. and may still be subsequently alterable by the manufacturer or a customer who knows the proper key sequences. The key sequences may be customized for each customer via hardware and/or software.

Once the irrevocable security mode has been entered, only destructive methods may be used to alter the security mode. In the irrevocable security mode, access from external to the chip is limited and security is maximized as discussed above for FIGS. 1-2. If the part is depotted and blanket exposed to UV light, only a 11 binary value or a 00 binary value results in the security bits (i.e. the revocable mode is entered). The key must then be known or discovered by a pirate in order to enter the normal mode of operation. Therefore, the security scheme described in FIG. 3 is more secure than the part described in FIGS. 1-2 herein.

When secure, an integrated circuit can execute instructions and fetch data from internal memory locations (memory 13) and can read or write data from/to external memory locations and external peripherals. The integrated circuit cannot read central processing unit (CPU) instructions from external memory locations, and visible internal address and data activity is blocked from the IC pins and any other regions externally accessible from the integrated circuit.

Figure 4:
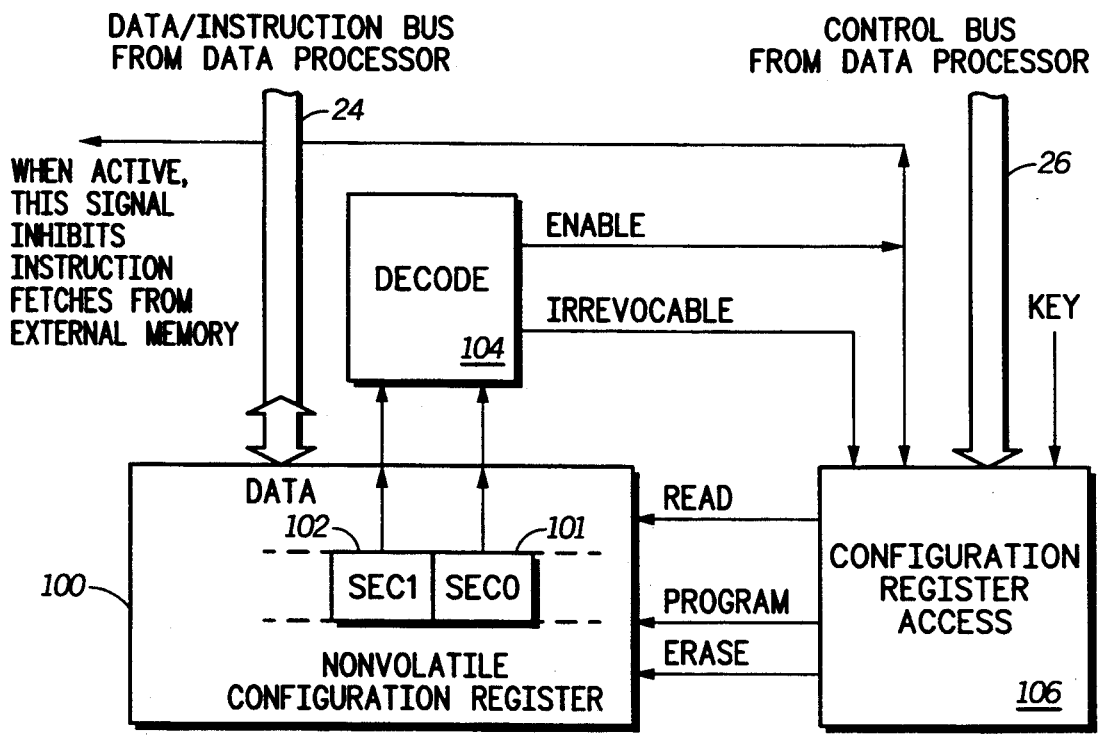
FIG. 4 illustrates in a block diagram form a circuit which implements the three security modes illustrated in FIG. 3.

FIG. 4 illustrates a circuit which implements the security illustrated via FIG. 3. The data/instruction bus 24 and the control bus 26 are illustrated in FIG. 4. The data/instruction bus 24 is connected to a non-volatile configuration register 100. Nonvolatile configuration register 100 has a first security bit 101 (labeled SEC0) and a second security bit 102 (labeled SEC1). N security bits may be used wherein N is greater than 2. Therefore, theoretically, $2^N$ different security levels/modes may be utilized. The bits 101 and 102 are connected to a decoder or decode circuit 104. Decode circuit 104 uses the bits 101 and 102 to produce at least one control signal. In FIG. 4, an enable signal output is illustrated for decoder circuit 104 and an irrevocable signal output is illustrated for decoder circuit 104. It should be apparent that other decoding schemes will work for the circuit of FIG. 4. The enable and irrevocable signal outputs are connected to a configuration register access circuit 106. Configuration register access circuit 106 controls reading access, erasing access, and programming access to bits 101 and 102. In order to control reading, erasing, and programming of the bits 101 and 102, three control signals labeled "erase", "program", and "read" are output by the circuit 106. A key control signal input labeled "key" is illustrated for circuit 106 in FIG. 4. The key control signal may be generated via a human user of the system 10 or may be generated either internal to the integrated circuit or external from the integrated circuit.

In the normal mode of operation the bits 101 and 102 are, for example, in a 10 binary state. The irrevocable signal and the key signal are inactive. In this condition, the data processor can access instructions or data from external memory and can freely program, erase, or read the configuration register 100.

In the revocable security state, bits 101 and 102 are either a 00 binary value or a 11 binary value (i.e. both programmed or both erased). The irrevocable signal and the key signal are inactive while the enable signal is active. The enable signal is active to indicate that security has been enabled. The active enable signal prevents the data processor from fetching instructions directly from external memory and blocks the visibility of internal data from external to the integrated circuit. The inactive key in combination with the active enable signal prevents the integrated circuit from erasing or programming the configuration register 100. Since the irrevocable signal is not active, the data processor can perform one or more customer specific key sequences to activate the key signal. Once the key signal is activated (and the irrevocable signal is inactive), the integrated circuit can erase or program the configuration register 100 to a different security state.

In the irrevocable security mode, the bits 101 and 102 are, for example, in a 01 binary state. The enable and irrevocable signals are active. The active enable signal prevents the data processor from directly fetching instructions from external memory and blocks the visibility of internal operations external to the integrated circuit. The active irrevocable signal prevents the data processor from erasing or programming the configuration register regardless of the state of the key signal. Only destructive action, extraordinary action, or depotting and exposing to UV light can change the security of the integrated circuit.

Figure 5:
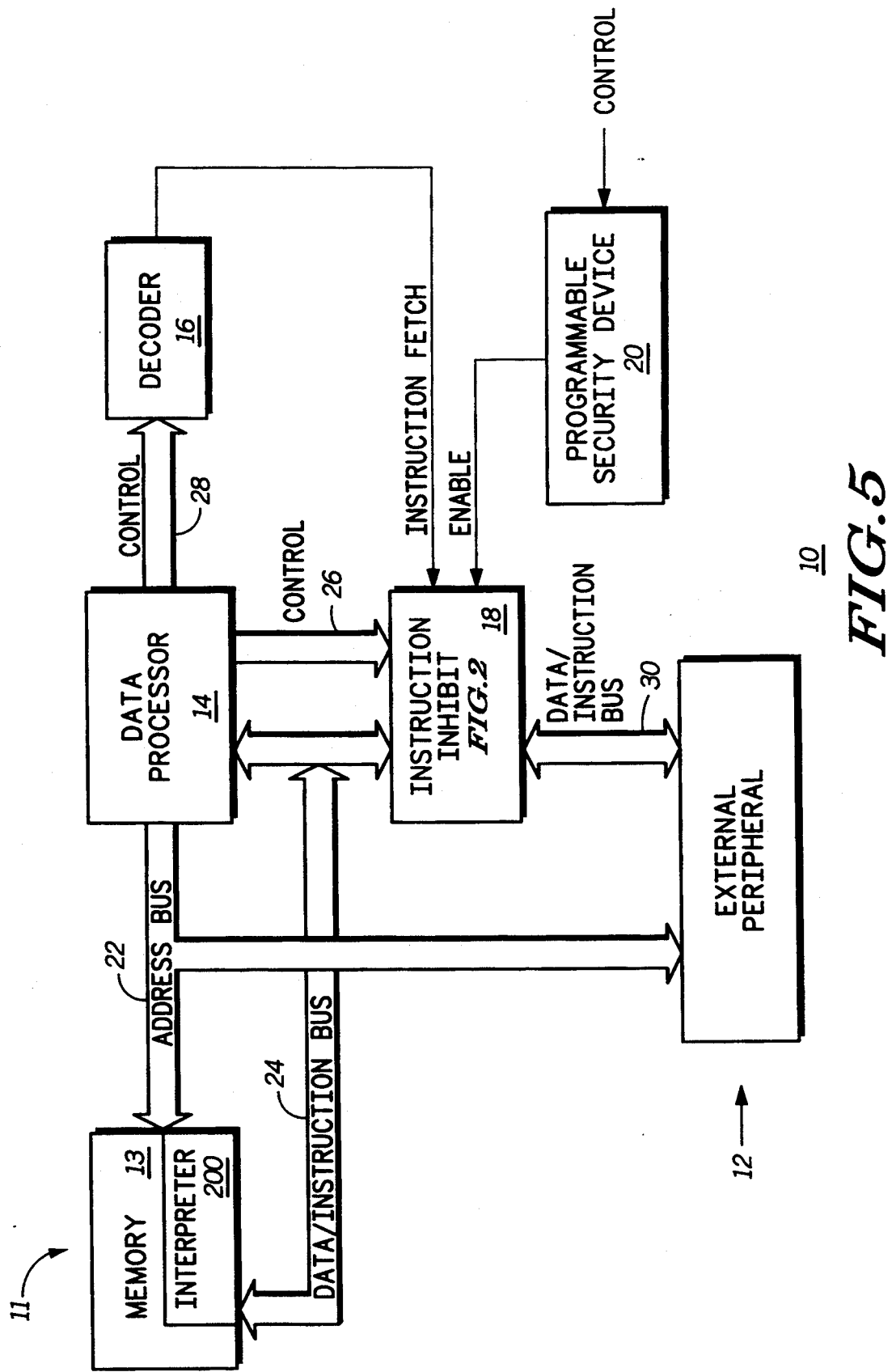
FIG. 5 illustrates in a block diagram form an interpreter which may be used in the system illustrated in FIG. 1.

FIG. 5 illustrates that an interpreter algorithm or a hardware interpreter may be used in the system of FIG. 1. In FIG. 5, a software interpreter 200 is illustrated as being stored within memory 13. When in a secure mode that limits external instruction access, such as the revocable security mode or the irrevocable security mode, the data processor may enable the interpreter 200. The interpreter can then read instructions from external to the integrated circuit without allowing instructions to have direct access to secure areas of the package portion 11. Therefore, select instructions, which do not compromise the security mode, may be accessed from external to the integrated circuit, processed by the interpreter into interpreted values, and the interpreted values properly executed by the processor 14. The interpreted values may be integrated circuit data and/or integrated circuit instructions.

If the interpreter 200 receives an instruction which would violate security, such as writing secure data to an external peripheral device, altering secure code, and/or the like, the interpreter 200 may terminate operations, ignore the violating instruction, tighten integrated circuit security, set a flag that indicates the integrated circuit was subjected to a security breach attempt, and/or the like. The interpreter 200 may be coded to recognize any high-level, mid-level or machine-level computer language. In general, the interpreter 200 allows external instructions to be executed internal to the integrated circuit while the integrated circuit is in a secure mode of operation. The interpreter 200 functions as a security gate to the external software environment.

While there have been described herein the principles of the invention, it is to be clearly understood to those skilled in the art that this description is made only by way of example and not as a limitation to the scope of the invention. For example, the control signals illustrated herein, such as "control", "enable", "key", etc. may be either internally generated or externally supplied to the system 10. Accordingly, it is intended, by the appended claims, to cover all modifications of the invention which fall within the true spirit and scope of the invention.

I claim:

1. In a data processing system, an integrated circuit having a security system, said integrated circuit comprising:

circuitry within said integrated circuit for manipulating integrated circuit data;

circuitry within said integrated circuit for storing the integrated circuit data, the circuitry for storing the integrated circuit data being coupled to the circuitry for manipulating the integrated circuit data;

means for providing the integrated circuit data to a location external to the integrated circuit, the means for providing the integrated circuit data being coupled to the circuitry for manipulating the integrated circuit data;

means for receiving data from external to the integrated circuit, said means being coupled to the circuitry within said integrated circuit for storing integrated circuit data;

means for interpreting data from external to the integrated circuit, said means being coupled to the means for receiving external data wherein external data may be input from an external source through the means for receiving external data, the external data being interpreted into interpreted data or instructions by the means for interpreting external data, the interpreted data or instructions being used by the circuitry within said integrated circuit for manipulating integrated circuit data to perform data processing operations within the integrated circuit; and circuitry functioning as the security system, the security system being coupled to the means for providing the integrated circuit data, the security system providing one of three security levels to the means for providing the integrated circuit data, a first security level being a normal operation mode wherein the integrated circuit data may be accessed from external to the integrated circuit through the means for providing the integrated circuit data without security restrictions, a second security level being a revocable security mode wherein access to the integrated circuit data from external to the integrated circuit is limited, the revocable security mode being capable of being changed to another security level, a third security level being an irrevocable security mode wherein access to the integrated circuit data from external to the integrated circuit is limited, the irrevocable security mode cannot be nondestructively changed to another security level.

2. The data processing system of claim 1 wherein a key must be provided to the circuitry within said integrated circuit for manipulating integrated circuit data in order to change the revocable security mode to another security level.

3. The data processing system of claim 1 wherein the normal mode of operation is represented as a binary value which comprises a logic one and a logic zero.

4. The data processing system of claim 1 wherein the irrevocable mode of operation is represented as a binary value which comprises a logic zero and a logic one.

5. The data processing system of claim 1 wherein the irrevocable mode of operation is represented as a binary value which comprises one of either two logic zeros or two logic ones.

6. The data processing system of claim 1 wherein the circuitry within said integrated circuit for storing integrated circuit data comprises a memory cell selected from a group consisting of: a random access memory (RAM) cell, a read only memory (ROM) cell, an electrically erasable programmable read only memory (EEPROM), an erasable programmable read only memory (EPROM), a flash memory cell, a dynamic random access memory (DRAM) cell, a static random access memory (SRAM) cell, a fast static random access memory (FSRAM) cell, a content addressable memory (CAM) cell, a ferroelectric memory cell, and a ferrromagnetic memory cell.

7. A data processing system having an integrated circuit comprising:
means for executing computer instructions;
means for storing binary data coupled to the means for executing binary instructions; and
means for receiving data from external to the integrated circuit coupled to the means for storing binary data;
means for interpreting data from external to the integrated circuit coupled to the means for receiving data from external to the integrated circuit wherein the data from external to the integrated circuit may be input from an external source through the means for receiving data from external to the integrated circuit, the data from external to the integrated circuit being interpreted into interpreted data or instructions by the means for interpreting data, the interpreted data or instructions being used by the means for executing computer instructions to perform operations within the integrated circuit; and means for securing the data processing system coupled to the means for executing computer instructions, the means for securing providing one of N security modes to the data processing system where N is an integer greater than two, at least one of the N security modes being a normal mode of operation wherein security is at a minimum and access to binary data stored in the means for storing binary data is available to circuitry external to the integrated circuit, another of the at least one of the N security modes being a revocable security mode of operation wherein accessing of binary data in the means for storing binary data is more restricted than the access allowed by the normal mode of operation, the revocable security mode of operation being a mode of operation which may be nondestructively changed to another mode of operation, and yet another of the at least one of the N security modes being an irrevocable security mode of operation wherein accessing of binary data in the means for storing binary data is more restricted than the access allowed by the normal mode of operation, the irrevocable security mode of operation can only be destructively changed to another mode of operation.

8. The data processing system of claim 7 wherein a key must be provided to the means for securing the data processing system in order to change the revocable security mode of operation to another security mode of operation.

9. The data processing system of claim 7 wherein the normal mode of operation is represented as a binary value which comprises a logic one and a logic zero.

10. The data processing system of claim 7 wherein the irrevocable mode of operation is represented as a binary value which comprises a logic zero and a logic one.

11. The data processing system of claim 7 wherein the irrevocable mode of operation is represented as a binary value which comprises one of either two logic zeros or two logic ones.

12. The data processing system of claim 7 wherein the circuitry within said integrated circuit for storing integrated circuit data comprises a memory cell selected from a group consisting of: a random access memory (RAM) cell, a read only memory (ROM) cell, an electrically erasable programmable read only memory (EEPROM), an erasable programmable read only memory (EPROM), a flash memory cell, a dynamic random access memory (DRAM) cell, a static random access memory (SRAM) cell, a fast static random access memory (FSRAM) cell, a content addressable memory (CAM) cell, a ferroelectric memory cell, and a ferrromagnetic memory cell.

13. The data processing system of claim 7 wherein a peripheral device is coupled to the integrated circuit.

14. A method of providing a security feature in a data processor integrated circuit for use in a data processing system having at least one peripheral device coupled to the data processor integrated circuit, the data processor integrated circuit having a processing unit and internal memory with programmable security, the programmable security protecting the data processor integrated circuit unauthorized observation of internal processing operations in response to receipt of control signals, the method comprising the steps of:

providing initial data and instructions from the internal memory to the processing unit in response to receiving at least one address from the processing unit;

receiving additional data and instructions from the at least one peripheral device and processing the additional data and instructions and the initial data and instructions with the processing unit, the processing unit decoding all the received instructions and providing a first control signal indicating when the processing unit will receive an instruction;

receiving a second control signal from a user of the data processing system and enabling the programmable security by providing a third control signal which is provided having one of at least three logical states, each of the at least three logical states is not affected by an absence of power or presence of a reset and each of the at least three logic states represents a different mode of security, a first mode of security being a normal mode of operation, a second mode of security being a revocable security mode wherein access to the integrated circuit data from external to the integrated circuit is limited, the revocable security mode being capable of being changed to another mode of security, a third mode of security being an irrevocable security mode wherein access to the integrated circuit data from external to the integrated circuit is limited, the irrevocable security mode cannot be nondestructively changed to another mode of security;

selectively receiving external data from the peripheral device;

interpreting the external data via an interpreter circuit to provide interpreted values to the processing unit, the interpreted values being used by the processing unit to perform instruction operations within the data processor integrated circuit;

selectively inhibiting processing of externally provided additional instructions from the peripheral device when the first control signal is asserted and in response to the third control signal.

15. The method of claim 14 wherein the step of providing the third control signal comprises:
storing the third control signal as a binary value having at least two binary bits, the at least two binary bits being stored in a nonvolatile memory.

16. The method of claim 14 wherein the step of providing the third control signal comprises:
using a memory cell to store the third control signal, the memory cell being selected from a group consisting of: a read only memory (ROM) cell, an electrically erasable programmable read only memory (EEPROM), an erasable programmable read only memory (EPROM), a flash memory cell to store the third control signal, a ferroelectric memory cell, and a ferromagnetic memory cell.

17. The method of claim 14 wherein the step of providing the third control signal comprises:
providing a two-bit binary signal wherein one of either a logic one first bit and a logic zero second bit or a logic zero first bit and a logic one second bit represents an irrevocable mode of security wherein the mode of security can only be changed by destructive techniques.

18. The method of claim 14 further comprising the steps of:
receiving external data from the peripheral device; and
interpreting the external data via an interpreter algorithm stored within the memory to provide interpreted integrated circuit data or integrated circuit instructions to the processing unit, the interpreted integrated circuit data or integrated circuit instructions being used by the circuitry within said integrated processing unit to perform instruction operations within the integrated circuit.

19. The method of claim 14 wherein the step of providing the third control signal comprises:
providing a two-bit binary signal wherein either a binary value of 00 or a binary value of 11 represents a revocable mode of security wherein the mode of security can be changed by nondestructive techniques.

* * * * *